(12) United States Patent
Gierut

(10) Patent No.: US 7,293,476 B2
(45) Date of Patent: *Nov. 13, 2007

(54) POWER SENSOR MODULE FOR ENGINE TRANSMISSION AND DRIVELINE APPLICATIONS

(75) Inventor: Joseph J. Gierut, Winnebago, IL (US)

(73) Assignee: Honeywell International Inc., Morristown, NJ (US)

( * ) Notice: Subject to any disclaimer, the term of this patent is extended or adjusted under 35 U.S.C. 154(b) by 72 days.

This patent is subject to a terminal disclaimer.

(21) Appl. No.: 11/049,992

(22) Filed: Feb. 2, 2005

(65) Prior Publication Data

US 2006/0037410 A1    Feb. 23, 2006

Related U.S. Application Data

(60) Provisional application No. 60/603,329, filed on Aug. 20, 2004.

(51) Int. Cl.
*G01L 1/22* (2006.01)
(52) U.S. Cl. .................................. 73/863.335
(58) Field of Classification Search ............. 73/862.08, 73/801, 862.335
See application file for complete search history.

(56) References Cited

U.S. PATENT DOCUMENTS

| | | | |
|---|---|---|---|
| 4,210,900 A | | 7/1980 | Shavit ........................ 340/149 |
| 4,444,061 A | * | 4/1984 | Mathias ................... 73/862.06 |
| 4,513,626 A | * | 4/1985 | Obayashi et al. ...... 73/862.328 |
| 4,803,885 A | * | 2/1989 | Nonomura et al. .... 73/862.333 |
| 4,829,834 A | * | 5/1989 | Masom ................... 73/862.326 |
| 4,887,499 A | * | 12/1989 | Kipfelsberger ............... 81/470 |
| 4,890,501 A | * | 1/1990 | Schumacher ........... 73/862.325 |
| 5,205,163 A | * | 4/1993 | Sananikone ............... 73/152.48 |
| 5,357,179 A | * | 10/1994 | Abbagnaro et al. ........... 318/17 |
| 5,585,571 A | * | 12/1996 | Lonsdale et al. ....... 73/862.325 |
| 5,763,793 A | * | 6/1998 | Ng et al. ................ 73/862.326 |
| 6,631,646 B1 | | 10/2003 | Maitland ....................... 73/777 |
| 6,817,528 B2 | | 11/2004 | Chen ..................... 235/462.13 |
| 6,926,115 B2 | * | 8/2005 | Masaki et al. ............... 180/446 |
| 7,095,198 B1 | * | 8/2006 | O'Brien ....................... 318/432 |
| 2005/0001511 A1 | | 1/2005 | Kalinin et al. | |

FOREIGN PATENT DOCUMENTS

WO    WO 2006/035284    4/2006

OTHER PUBLICATIONS

Baldauf W., Frequenzanaloge Drehmomentmessung Mit Obertlaechenwellen-Resonatoren, Technisches Messen TM, Sep. 1991, vol. 58, No. 9., p. 329-334.

\* cited by examiner

*Primary Examiner*—Max Noori
(74) *Attorney, Agent, or Firm*—Richard H. Krukar; Kermit D. Lopez; Luis M. Ortiz

(57) ABSTRACT

A power sensor module suitable for automotive and other high volume applications is disclosed. The power sensor module combines a speed sensing and torque sensing operation into a single unit. A power measurement can be derived from torque and speed. Combining torque sensing and power sensing within a single module instead of using separate modules for each allows for reducing redundancies and lowering cost.

21 Claims, 10 Drawing Sheets

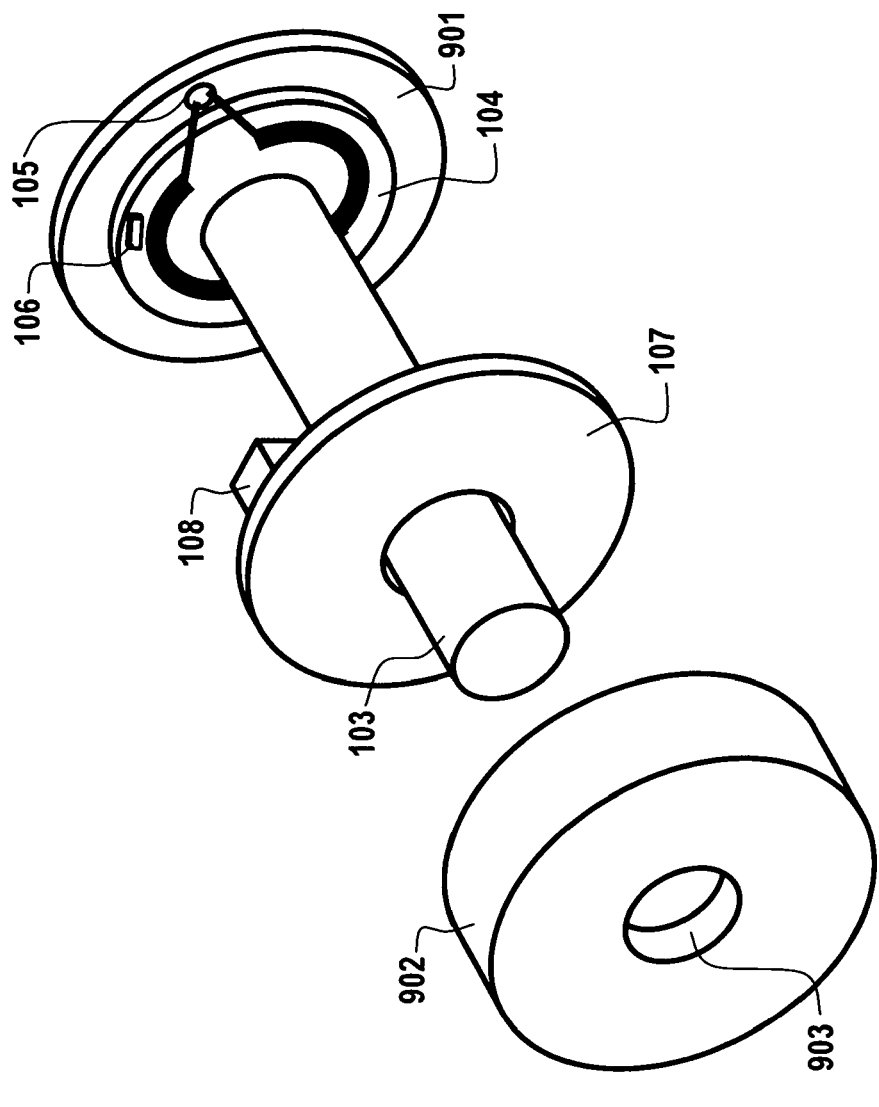
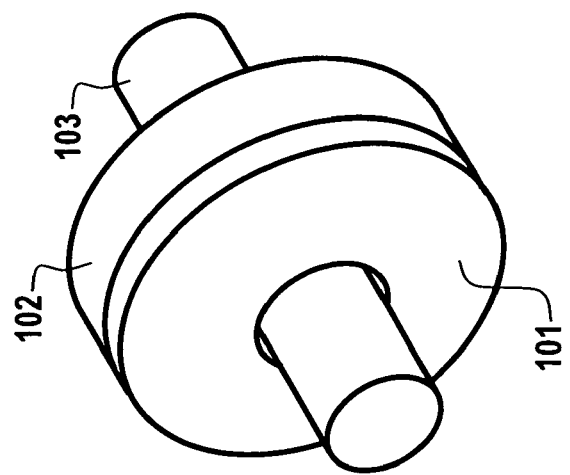
Fig. 9
Fig. 8

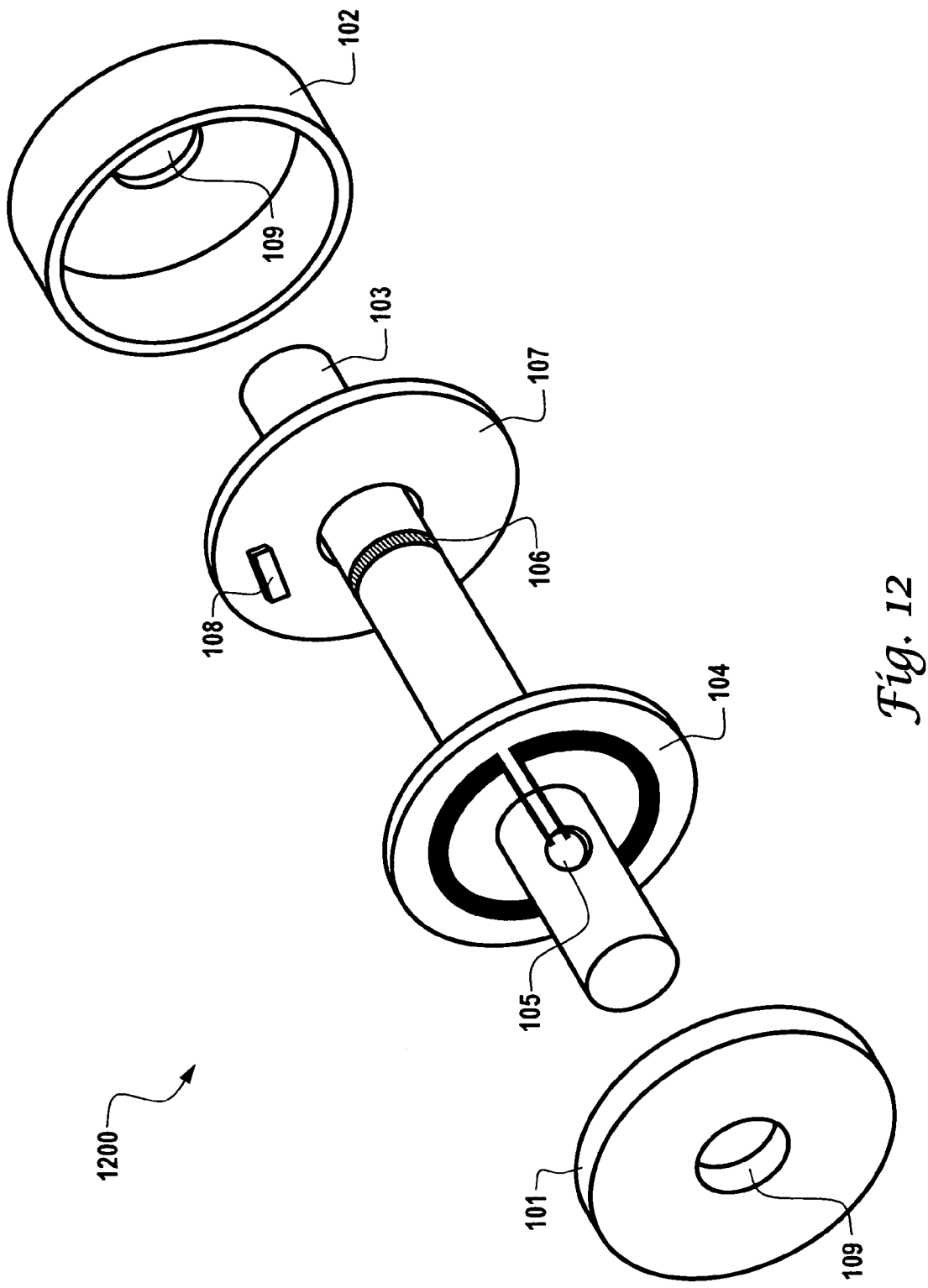

POWER SENSOR MODULE FOR ENGINE TRANSMISSION AND DRIVELINE APPLICATIONS

This application claims benefit of 60/603,329 of Aug. 20, 2004.

TECHNICAL FIELD

Embodiments relate to mechanical power sensing and mechanical power measurement. Embodiments also relate to constructing a power sensor module by packaging a torque sensor, a speed sensor, and related components within a single housing such that redundancies are exploited and costs reduced.

BACKGROUND OF THE INVENTION

Machinery must often apply power generated by an engine or motor to a purpose such as drilling a hole or turning a wheel. As such, the machinery must transfer mechanical power. Mechanical power is transferred by rotating elements such as shafts, plates, and gears. For example, in a car the power generated by the engine must be transferred to the wheels. Most car engines generate power that is available on a rotating shaft called the crankshaft. The crankshaft is connected to a transmission via a clutch. A clutch effects rotary power transfer by adjusting the friction between two plates. Forcing a spinning plate's face against another plate's face causes power transfer or loss at the interface.

Sometimes a viscous fluid resides between the plate faces, which are specially formed or textures, such that power is transferred without the plates actually touching. A transmission adjusts the power by transferring it through a set of gears. The power then proceeds via more rotating elements, such as shafts, plates and gears, to the wheels where it supplies motive force. Car wheels themselves may be viewed as rotating gears that transfer power to the surface of the earth.

People often desire to know how much power the engine produces. They also want to know how much power each rotating element transfers and how much power is available at the wheels because some power is lost in the transfer from engine to earth. Any machine that similarly transfers mechanical power to a purpose has similar losses. Rotational mechanical power can be calculated as a function of torque and speed.

Torque is a force applied to cause rotation. For example, someone can try to turn a bolt with a 1 foot (ft.) wrench by placing one end of the wrench on the bolt and pushing the other end with 100 pounds (lbs.) of force. In this example, that person has applied 100 ft.-lbs of torque. Torque is a well-known concept to those skilled in any of the arts of engines, motors or mechanical power transfer.

Torque can be measured in a variety of ways. One way is to measure the flex or strain of a rotating element, such as a rotating shaft. Whenever power is transferred along a shaft, the shaft will flex. If more power is transferred, then the shaft flexes more. Sometimes, part of the shaft is designed specially for torque measurements. A short length of the shaft can be made thinner so it flexes more. A short length of the shaft can be made of a material that flexes differently than the material used for the rest of the shaft. Instead of a section that is thinned or a different material, an apparatus that reacts to the torque can be used. Regardless of any special properties or sections of the shaft, the flex is measured.

One of the many different conventional techniques for measuring the flex involves measuring the stress, or strain, on the shaft. U.S. Pat. No. 6,631,646 discusses, for example, an apparatus for measuring strain. Another technique involves measuring the relative rotational offset between two sections of the shaft. U.S. Pat. No. 6,817,528, for example, discusses an apparatus for measuring the relative rotational offset between two rotating members. The torque on gears and plates can also be measured because they also flex when under the influence of torque.

Furthermore, the torque on a rotating element can be measured anywhere on the rotating element because when a rotating element flexes, the entire rotating element flexes. For example, a flange can be attached to a shaft or can be formed as part of the shaft. A torque sensor on the flange can be used to measure the torque on the shaft. Those skilled in any of the arts of engines, motors, or mechanical power transfer know these and many other ways of measuring the torque applied to a rotating element.

Speed is simply how fast something is going. Rotational speed is how fast something is spinning and is often measured as rotations per minute (rpm). One way to measure rotational speed is to count how many times a target mounted on a rotating element passes a stationary sensor per unit of time. Another method is to power an electric generator at a speed directly proportional to that of a rotating element, typically via a mechanical linkage such as a belt or gear, such that the voltage produced is a function of rotating element's speed. Those skilled in any of the arts of engines, motors, or mechanical power transfer know these and many other ways of measuring rotational speed.

Torque and speed can be either measured using sensors or targets attached to rotating elements. There are many kinds of rotating elements. Shafts, gears, plates, belts, wheels, flywheels, pulleys, and cables are examples of rotating elements. The common property of all rotating elements is that they rotate. Those skilled in any of the arts of engines, motors, or mechanical power transfer know these and many other types of rotating elements.

Power refers to the amount of energy that can be produced, delivered, or consumed in a certain amount of time. The power transferred by a rotating element is proportional to the element's rotational speed multiplied by the torque on the element. The following equation (1) can be utilized to calculate power:

$$\text{power(hp)} = \text{speed(rpm)} * \text{torque(ft-lbs)} / 5252 \qquad (1)$$

Where the speed is in rotations per minute, torque is in foot-pounds, and power is in horsepower. Accurate measurements of the power transferred by a rotating element require accurate measurements of both speed and torque.

Heavy equipment and other large machines often incorporate sensors for measuring speed and torque. In general, these machines perform torque sensing in one module and speed sensing in another module. This is because of the size of the machine and the view that torque sensing is functionally different and separate from speed sensing. Additionally, torque sensing has customarily involved special hardware and foresight in machine design whereas speed sensing can be incorporated as an inexpensive afterthought. As a result, measurements of power have been available, but only as the result of a calculation derived from one measurement from a speed sensing module and another measurement from a torque sensing module.

Many applications, such as automotive, rarely have power measurements available because they are extremely price sensitive. The current solutions for power measurements are not appropriate for automotive engine, transmission, and drive train applications. There are many similar cost sensitive applications for which an adequate way to measure power does not exist.

Most sensors require wires that carry signals and power. Electrical power enables a sensor to operate. Input signals generally carry control information such as synchronization or operational commands to the sensor. Output signals generally carry sensor readings, diagnostics, or other information to external circuitry. Some sensors are battery powered and receive control signals and transmit output signals wirelessly. A sensor with low enough power requirements can be powered wirelessly. Such sensors often receive power and input signals and transmit output signals via inductive coupling.

The embodiments disclosed herein therefore directly address the shortcomings of conventional systems and devices by combining a torque sensor and a speed sensor into a single power sensor module that is suitable for many price sensitive applications.

BRIEF SUMMARY

It is therefore one aspect of the embodiments to provide a torque sensor and a speed sensor incorporated into a single module.

It is another aspect of the embodiments to provide for the stationary circuit to transmit electromagnetic energy to the rotating circuit via inductive coupling.

It is a further aspect of the embodiments to provide for measuring the speed of the rotating element.

It is also another aspect of the embodiments to provide for processing the speed signal to produce a speed measurement.

It is an additional aspect of the embodiments to use the torque signal to produce a torque measurement.

It is a yet further aspect of the embodiments to produce a power measurement from a speed measurement and a torque measurement.

It is another aspect of the embodiments to enclose a speed sensor and a torque sensor within the same housing.

The aforementioned aspects and other objectives and advantages can now be achieved as described herein. As indicated above, in one aspect a torque sensor and a speed sensor are incorporated into a single module. The two major parts of the module are the stationary parts and the rotating parts. The stationary parts include a housing, stationary circuitry, and speed sensor. The rotating parts include a target for the speed sensor, a torque sensor, and a rotating circuit.

Torque measurement is accomplished by use of a torque sensor mounted on a rotating element, rotating circuitry fixed to the rotating element, a stationary circuit, and at least one processor. The torque sensor itself can be any of the current solutions that are well known to those skilled in any of the arts of engines, motors, or mechanical power. Additionally, a sensor based on one or more SAWs can be used for torque sensing. SAWs are relative newcomers to the area of torque sensing but they exhibit excellent sensitivity and are inexpensive. Additionally, SAWs typically require so little power that they can be powered, controlled, and read wirelessly.

In accordance with another aspect, the stationary circuit transmits electromagnetic energy to the rotating circuit via inductive coupling. The rotating circuit, being electrically connected to the torque sensor, powers the torque sensor. The torque sensor, sensing the torque on the rotating element, produces torques sensor signal based on the sensed torque. The torque sensor signal is then passed to the rotating circuit where it is converted to the transmitted torque signal that is transmitted by the rotating circuit and received by the stationary circuit. The stationary circuit converts the transmitted torque signal into the torque signal and makes the torque signal available for processing. In this manner, a signal indicative of the torque on the rotating element can be passed from a rotating torque sensor to an outside circuit where it can be processed. Processing the torque signal along with a speed signal or a speed measurement can produce a power measurement.

In accordance with another aspect, the speed of the rotating element is measured. A target is affixed to either the rotating element or the rotating circuit. A speed sensor can be fixed to the stationary circuit. The speed sensor detects the movement of the target. The speed sensor produces an electric signal called the speed signal based on the detected movement of the target. In this manner, a signal indicative of the speed of the rotating element can be passed to an outside circuit where it can be processed. Processing the speed signal along with a torque signal or a torque measurement can produce a power measurement.

In accordance with another aspect, the speed sensor and torque sensor are both enclosed within the same housing. Part or all of the housing can be stationary and can have apertures through which the rotating elements pass. For example, a rotating shaft can pass through a hole in the housing. Alternatively, a rotating element, such as a plate or gear, can be used as part of the housing. The housing is designed for the purpose of enclosing the other parts of the power sensor module and it can also serve other purposes. For example, one side of the housing could also be part of a ball bearing assembly. Another example is that one side of the housing could also function as the flex plate of an automatic transmission. The two examples given here are intended to illustrate the ease with which the housing or parts of the housing could be incorporated into other functional parts of an engine, motor, transmission, or drive train and are not intended to limit this aspect in any way.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 8 illustrates a power sensor module in accordance with a preferred embodiment;

FIG. 9 illustrates a power sensor module in accordance with a preferred embodiment;

FIG. 12 illustrates a power sensor module in accordance with a preferred embodiment.

DETAILED DESCRIPTION

Figure 1:
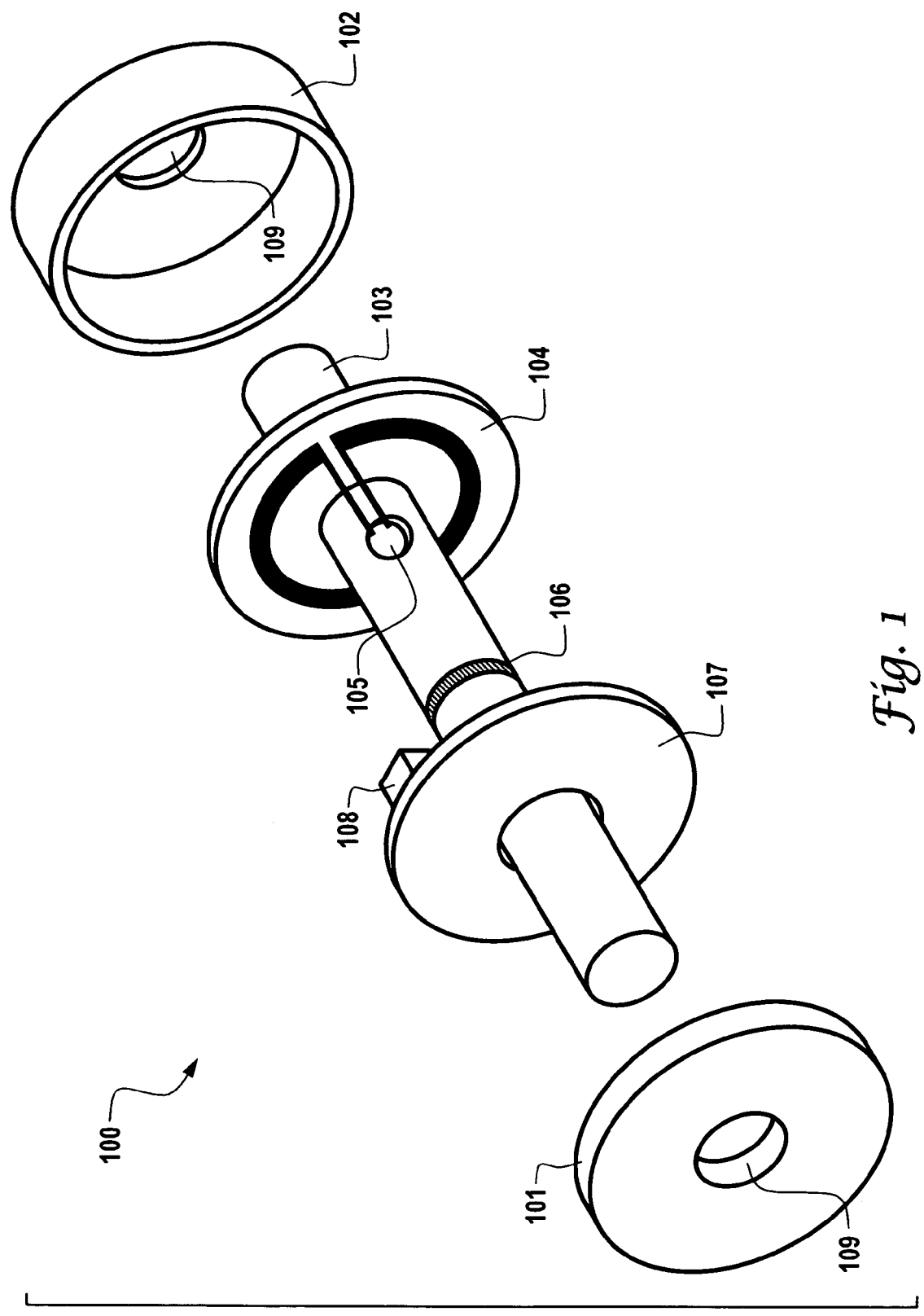
FIG. 1 illustrates a power sensor module in accordance with a preferred embodiment.

FIG. 1 illustrates an aspect of the power sensor module 100. A stationary housing, comprising a left side housing 101 and a right side housing 102, encloses the other parts of the power sensor module. The each side housing has an aperture 109 through which the rotating shaft 103 passes. There are numerous equivalent ways construct a housing. Inside the housing, the rotating shaft 103 passes through the stationary circuit 107 and the rotating circuit 104. The rotating circuit 104 is fixed to the rotating shaft 103 such that it rotates also. The target 106 and the torque sensor 105 are also fixed to the rotating shaft 103. The torque sensor 105 is electrically connected to the rotating circuit 104. A speed sensor 108 is fixed to the stationary circuit.

Figure 2:
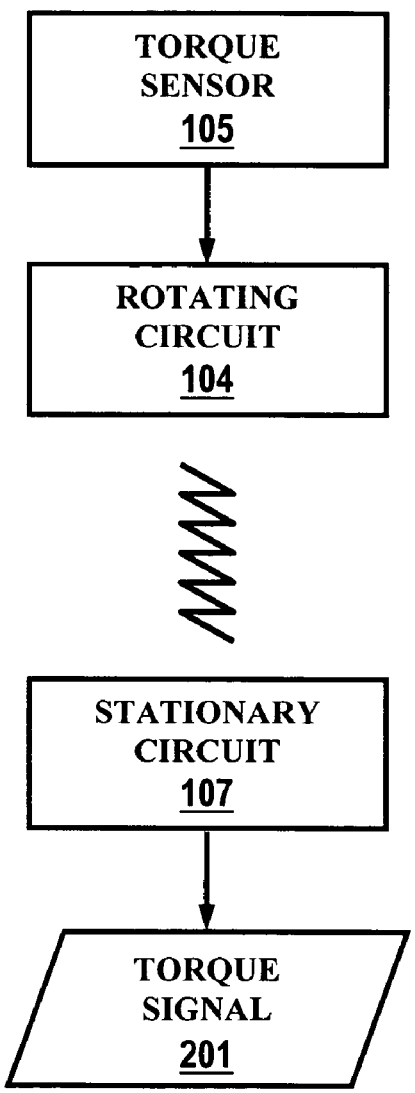
FIG. 2 illustrates an operational flow for torque sensing in accordance with a preferred embodiment.

FIG. 2 illustrates operational aspects of torque sensing using the components shown in FIG. 1. The torque sensor 105 produces a torque sensor signal that is passed via a direct electrical connection to the rotating circuit 104. The rotating circuit 104 converts the torque sensor signal into the transmitted torque signal that is transmitted to the stationary circuit 107. The stationary circuit 107 receives the transmitted torque signal and converts it into the torque signal 201. The torque signal 201 is available for further processing. The stationary circuit 107 also transmits electromagnetic energy to the rotating circuit 104. The rotating circuit 104 receives the energy and uses it to power itself and to power the torque sensor 105. The torque sensor 105 can be any of the wide variety of torque sensors as discussed earlier, including SAW based torque sensors.

Another aspect is that the stationary circuit 107 can transmit control signals to the rotating circuit 104. The control signals can be used to control operation of the rotating circuit 104, such as adjusting amplifiers or modulators if those components are part of the rotating circuit. The control signals can also be passed to the torque sensor if the torque sensor is a type that has control signal inputs.

Figure 3:
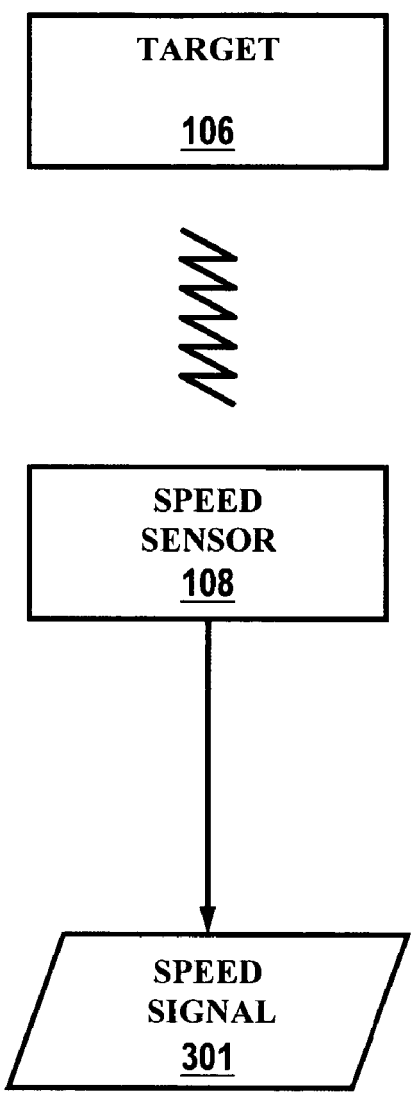
FIG. 3 illustrates an operational flow for speed sensing in accordance with a preferred embodiment.

FIG. 3 illustrates aspects of speed sensing using the components shown in FIG. 1. The target 106, being fixed to the rotating shaft 103 shown in FIG. 1, has the same rotational speed as the rotating shaft 103. The target itself can be gear teeth, a magnet, a coil of wire, a reflective spot, or anything else that can be sensed by the speed sensor 108. The speed sensor 108 senses the movement of the target 106 and produces an electric signal called the speed signal 301. For example, if the target 106 is a single magnet and the speed sensor 108 is a coil of wire then the speed signal 301 would be a series of pulses with one pulse per revolution of the rotating shaft 103. A speed measurement can be found by processing the speed signal 103. In the example, one way to process the speed signal would be count the number of pulses that occur within one minute. The total would be the rpm of the rotating shaft.

FIG. 3 is intended to show one aspect of sensing speed. Those skilled in the art of speed sensing know many functionally equivalent techniques. For example, multiple targets can be used. The individual teeth on a gear or the multiple north-south poles on a polarized ring magnet can be used. Furthermore, some speed sensors produce a speed signal based on changing magnetic flux introduced by a multi-poled magnetic target or a ferrous target with a tooth slot pattern that perturbs a magnetically biased sensor. These sensors may be passive (coil based variable reluctance devices) or active (Hall Effect or magneto-resistive thin film devices produced by standard integrated circuit fabrication processes). Optical speed sensors are another option that is typically used in less harsh environments. Finally, instead of counting pulses over a known period to obtain the speed, the time between pulses can be used to calculate the speed.

Figure 4:
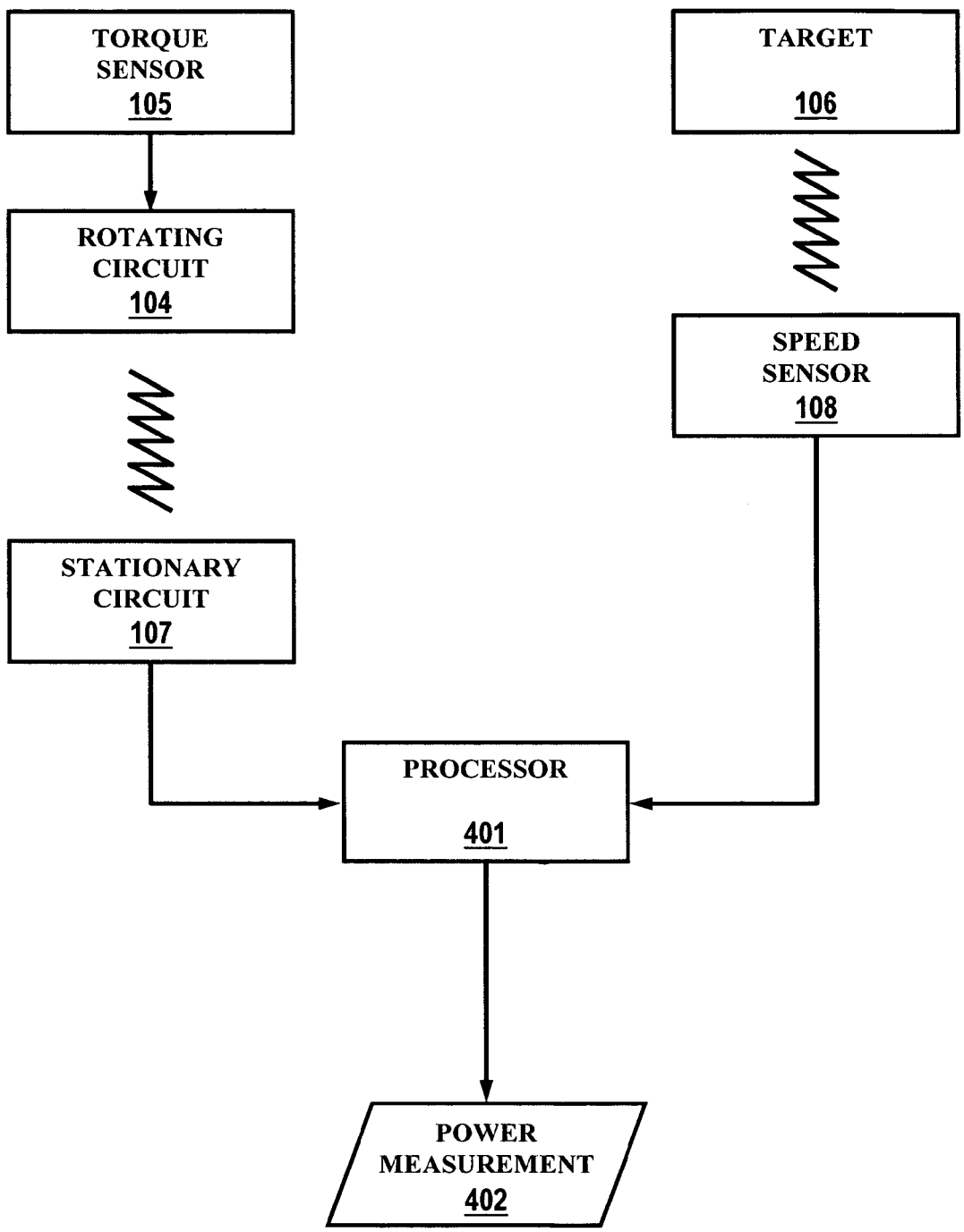
FIG. 4 illustrates an operational flow for measuring power in accordance with a preferred embodiment.

Another aspect is shown in FIG. 4. In FIG. 4, a torque signal is produced as shown in FIG. 2 and a speed signal is produced as shown in FIG. 3. However, in FIG. 4, neither the torque signal nor the speed signal is shown because they are both input into a processor 401 that uses them to produce a power measurement 402. A processor can be an analog electronic device, a digital electronic device, or a combination. The distinguishing characteristic of a processor is that it accepts at least one signal or measurement and produces a measurement. The difference between a signal and a measurement is that only processors can produce measurements.

Figure 5:
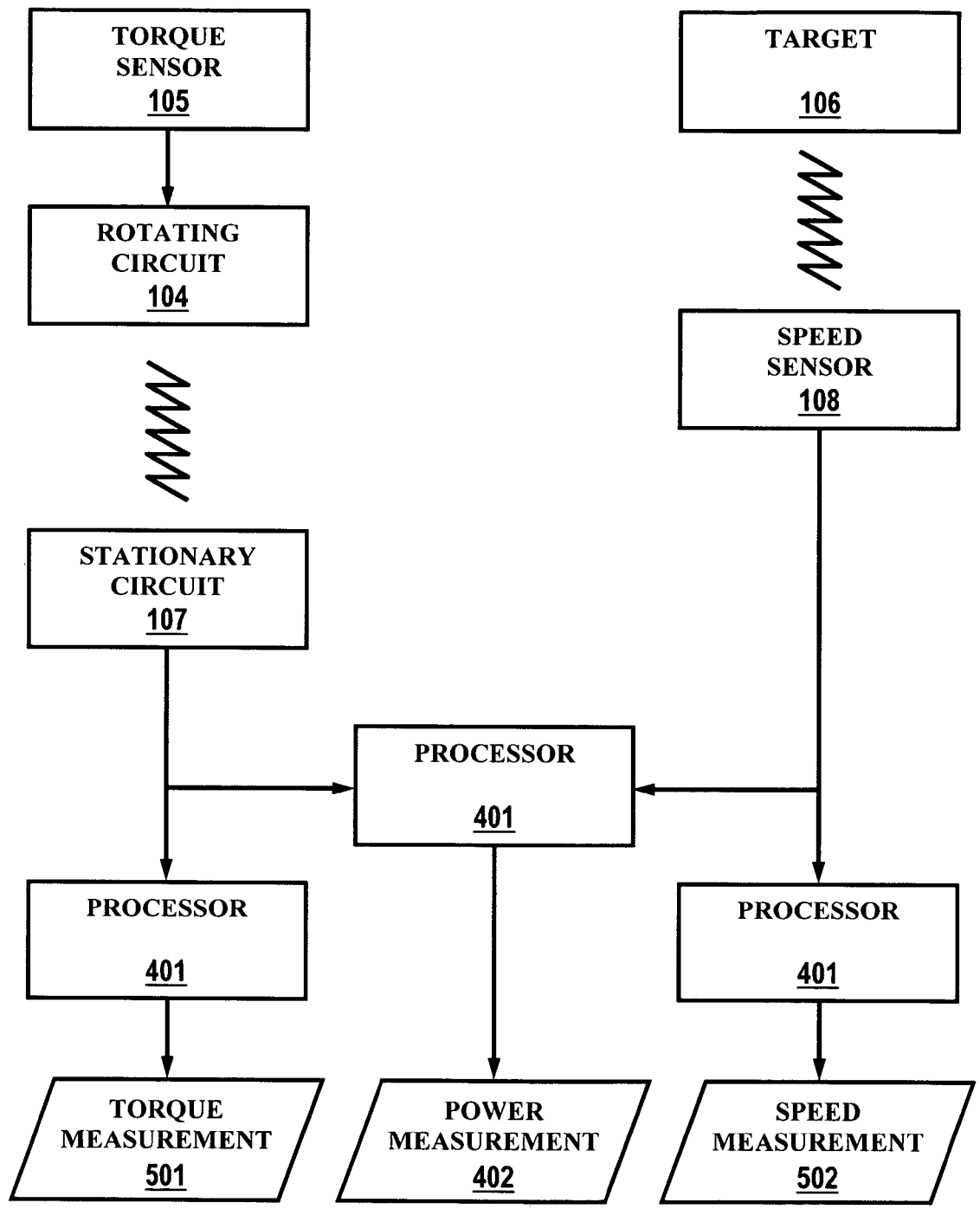
FIG. 5 illustrates an operational flow for measuring power, speed and torque in accordance with a preferred embodiment.

Another aspect is shown in FIG. 5. In FIG. 5, a power measurement 402 is produced as it was in FIG. 4. However, a torque measurement 501 and a speed measurement 502 are also produced. A processor 401 that has the torque signal as an input produces the torque measurement 501. A different processor 401 that has the speed signal as an input produces the speed measurement 502. An aspect not shown in the figure is that a single processor can accept the torque signal and the speed signal as inputs and use them to produce a speed measurement, a torque measurement, and a power measurement.

Figure 6:
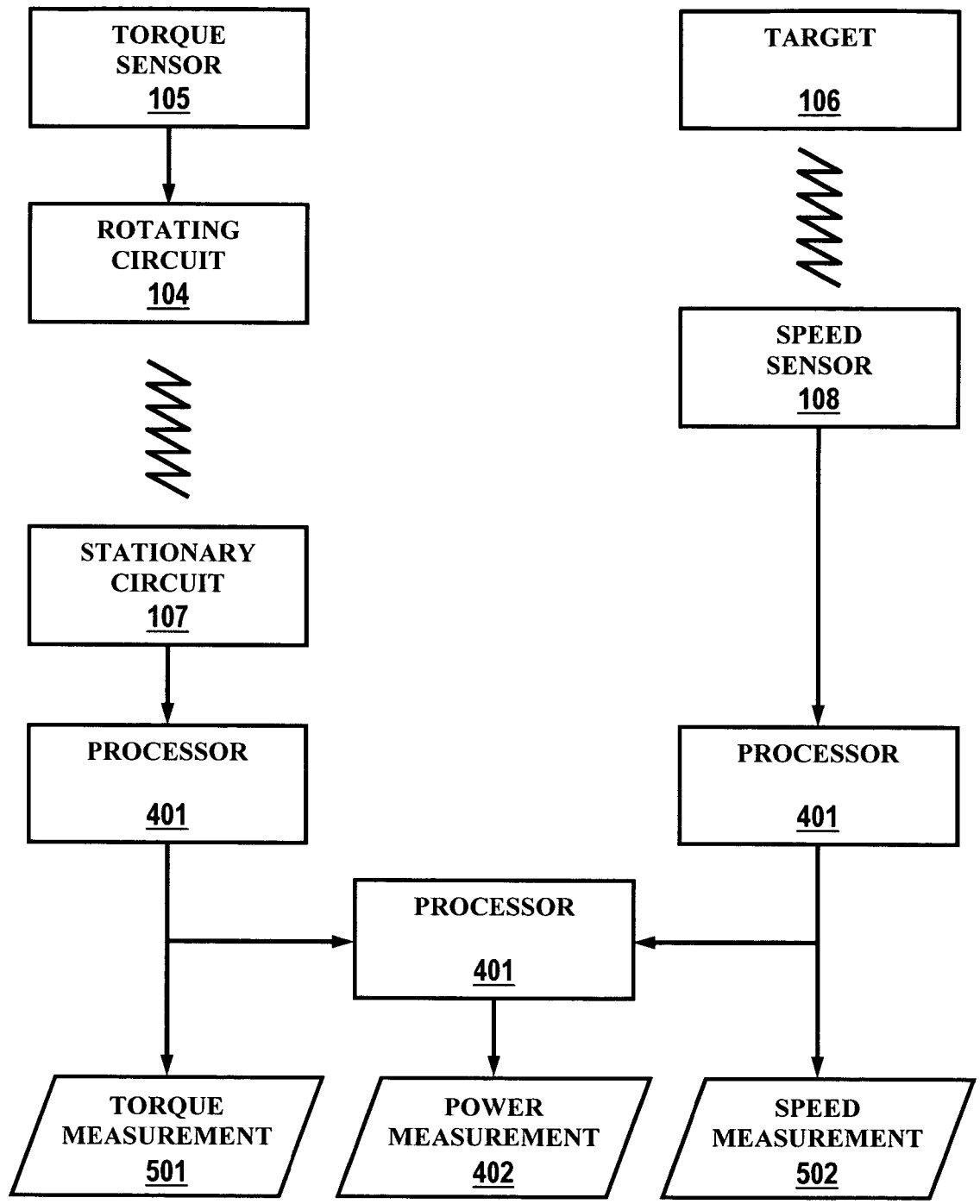
FIG. 6 illustrates an operational flow for measuring power, speed and torque in accordance with a preferred embodiment.

Another aspect is shown in FIG. 6. In FIG. 6, a torque signal is produced as shown in FIG. 2 and a speed signal is produced as shown in FIG. 3. However, in FIG. 6 the torque signal is not shown because it is input into a processor 401 that uses it to produce a torque measurement 501. Additionally, in FIG. 6 the speed signal is not shown because it is input into a processor 401 that uses it to produce a speed measurement 502. Furthermore, the speed measurement 502 and the torque measurement 501 are input to another processor 401 that uses them to produce a power measurement 402.

Figure 7:
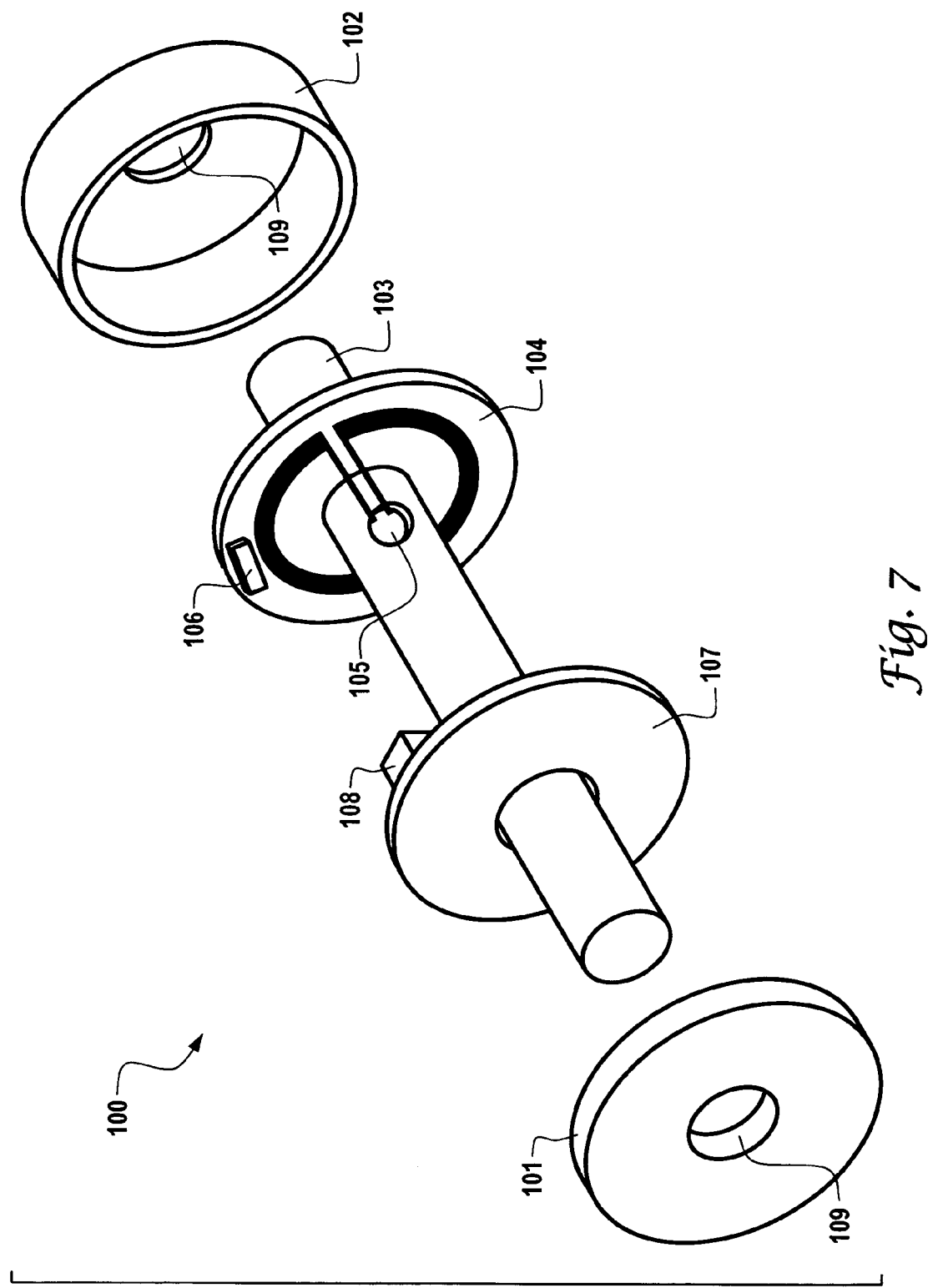
FIG. 7 illustrates a power sensor module in accordance with a preferred embodiment.

FIG. 7 illustrates another aspect of the power sensor module. A stationary housing, comprising a left side housing 101 and a right side housing 102, encloses the other parts of the power sensor module. The side of each housing has an aperture 109 through which the rotating shaft 103 passes. There are numerous equivalent ways to construct a housing. Inside the housing, the rotating shaft 103 passes through the stationary circuit 107 and the rotating circuit 104. The rotating circuit 104 is fixed to the rotating shaft 103 such that it rotates also. The torque sensor 104 is also fixed to the rotating shaft 103. The torque sensor 105 is electrically connected to the rotating circuit 104. A speed sensor 108 is fixed to the stationary circuit. However, unlike the apparatus diagrammed in FIG. 1, in FIG. 7 the target 106 is attached to the rotating circuit. The speed sensor 108 still detects the movement of the target 106 as before and there is no fundamental difference in operation. The difference is that mounting the target 106 on the rotating circuit 104 instead of the rotating shaft 103 results in fewer components being fixed directly to the rotating shaft 103.

FIG. 8 illustrates another aspect. FIG. 1 and FIG. 7 showed 2 different apparatus in an exploded view wherein many components of power sensor modules were visible. FIG. 8 illustrates a power sensor module fully assembled. As such, only the left side housing 101, right side housing 102, and rotating shaft 103 are visible. That is because the housing encloses the other parts of the power sensor module.

FIG. 9 illustrates another aspect. A plate 901 is directly attached to the rotating shaft 103. The rotating circuit 104 can be attached to the plate 901 or to rotating shaft 103. The target 106, shown mounted on the rotating circuit 104, can also be mounted directly to the plate 901. The rotating circuit 104 is shown as a circular substrate, such as a printed circuit board, on which circuit components can be mounted. However, for some applications the rotating circuit 104 can also function as a plate. The torque sensor 105 is mounted to the plate 901. The left side housing 902 has a cavity for enclosing the stationary circuit 107. In some applications, the left side housing 902 can also be the substrate of the stationary circuit 107. When the power sensor module of FIG. 9 is fully assembled, the left side housing 902 and the plate 901 form a housing that encloses the other components, except for the rotating shaft that protrudes through an aperture 903.

Figure 10:
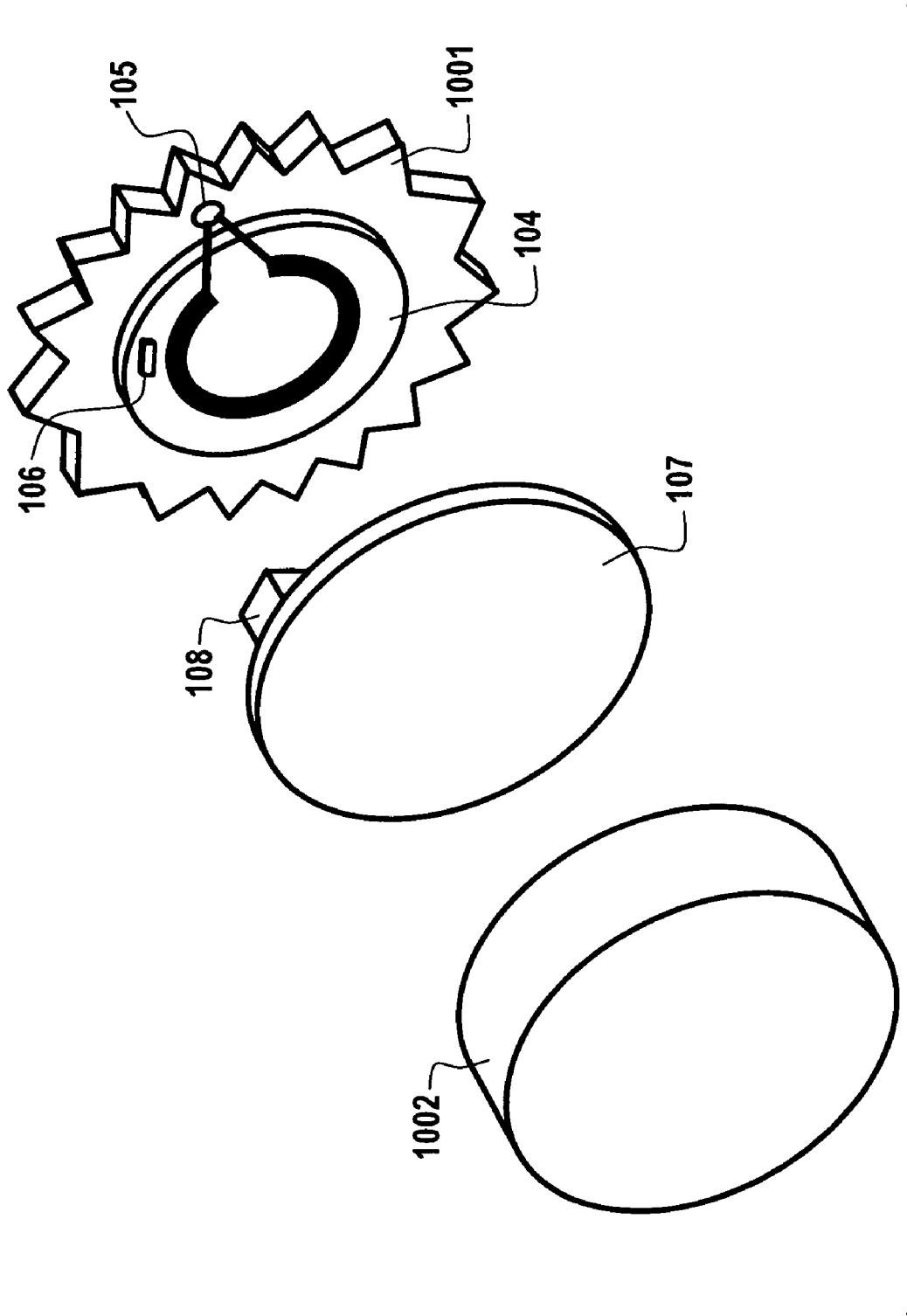
FIG. 10 illustrates a power sensor module in accordance with a preferred embodiment.

FIG. 10 illustrates another aspect wherein a gear 1001 is used. The gear 1001 is a rotating element to which the rotating circuit 106 and the torque sensor 105 are attached. The target 106 is shown attached to the rotating circuit 104, although the target 106 can just as easily be attached to the gear 1001. The rotating circuit 104 is shown as a circular substrate, such as a printed circuit board, on which circuit components can be mounted. However, for some applications the gear 1001 can be the substrate for the rotary circuit 104. The left side housing 1002 is designed to hold the stationary circuit 107 on which the speed sensor 108 is mounted. The speed sensor 108 can also be mounted directly to the left side housing 1002. In some applications, the left side housing 1002 can also be the substrate of the stationary circuit 107. When the power sensor module is fully assembled, the left side housing 1002 and the gear 1001 form a housing that encloses the other components.

Figure 11:
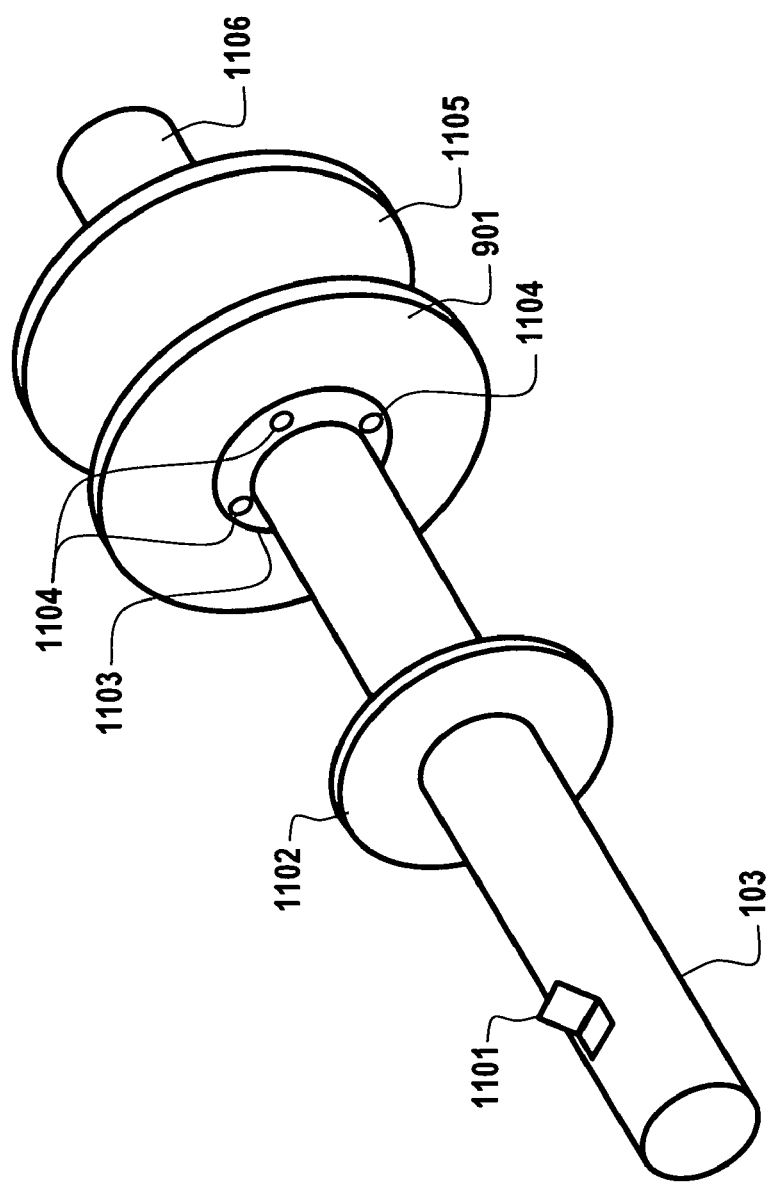
FIG. 11 illustrates aspects of flanges, plates, and clutches in accordance with a preferred embodiment.

FIG. 11 illustrates rotating shafts 103 with flanges and plates. One flange 1101 is a tab of material attached to the rotating shaft 103. Another flange 1102 is a circular disk formed as part of the rotating shaft. Another flange 1103 is a circular disk attached to the rotating shaft 103. Fasteners 1104 attach a plate 901 is attached to the flange 1103. There is a second plate 1105 shown attached to a second rotating shaft 1106. When the first plate 901 is forced, face to face, against the second plate 1105 then the two plates are mechanically joined by friction. This is how a clutch works. The elements shown in FIG. 11 illustrate some aspects of flanges, plates, and clutches, but are not intended to limit the present invention to the aspects shown.

FIG. 12 illustrates another aspect of the embodiment. It shows a power sensor module that is similar to that shown in FIG. 1. The difference is that the torque sensor 105 is not in between the stationary circuit 107 and rotating circuit 104. In some applications, the distance between the stationary circuit 107 and the rotating circuit 104 must be controlled and there is not enough room for a torque sensor 105. FIG. 12 also illustrates that many minor variations in the placement of elements result in an equivalent power sensor module implementations.

It will be appreciated that variations of the above-disclosed and other features, aspects and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A power sensor module, adapted for use with a rotating shaft, comprising:

a housing and a torque sensor within the housing and mounted on the rotating element wherein the torque sensor produces a torque sensor signal based on the amount of torque applied to the rotating element;

a rotating circuit inside the housing and connected to the rotating element such that the rotating circuit obtains the torque sensor signal and produces a transmitted torque signal;

a stationary circuit that receives the transmitted torque signal and produces a torque signal;

a target inside the housing and mounted on the rotating element; and a speed sensor inside the housing such that the speed sensor detects the target and produces a speed signal.

2. The power sensor module of claim 1 wherein the torque sensor uses at least one surface acoustic wave device.

3. The power sensor module of claim 2 further comprising a processor that receives the torque signal and receives the speed signal and produces a power measurement.

4. The power sensor module of claim 3 further comprising;

a processor that receives the torque signal and produces a torque measurement; and a processor that receives the speed signal and produces a speed measurement.

5. The power sensor module of claim 1 further comprising a processor that receives the torque signal and receives the speed signal and produces a power measurement.

6. The power sensor module of claim 1 further comprising;

a processor that receives the torque signal and produces a torque measurement; and a processor that receives the speed signal and produces a speed measurement.

7. The power sensor module of claim 6 further comprising a processor that receives the speed measurement and receives the torque measurement and produces a power measurement.

8. A power sensor module adapted for use with a rotating element incorporating:

a housing;

a torque sensor inside the housing and mounted on the rotating element wherein the torque sensor produces a torque sensor signal based on the amount of torque applied to the rotating element;

a rotating circuit inside the housing and connected to the rotating element such that the rotating circuit obtains the torque sensor signal and produces a transmitted torque signal;

a stationary circuit that receives the transmitted torque signal and produces a torque signal;

a target inside the housing and mounted on the same substrate as the rotating circuit; and a speed sensor inside the housing such that the speed sensor detects the target and produces a speed signal.

9. The power sensor module of claim 8 wherein the torque sensor uses at least one surface acoustic wave device.

10. The power sensor module of claim 9 further comprising a processor that receives the torque signal and receives the speed signal and produces a power measurement.

11. The power sensor module of claim 10 further comprising;
   a processor that receives the torque signal and produces a torque measurement; and
   a processor that receives the speed signal and produces a speed measurement.

12. The power sensor module of claim 8 further comprising a processor that receives the torque signal and receives the speed signal and produces a power measurement.

13. The power sensor module of claim 8 further comprising;
   a processor that receives the torque signal and produces a torque measurement; and
   a processor that receives the speed signal and produces a speed measurement.

14. The power sensor module of claim 13 further comprising a processor that receives the speed measurement and receives the torque measurement and produces a power measurement.

15. A method of producing a speed signal indicating the speed of a rotating element while also producing a torque signal indicating the torque placed on the rotating element, said method comprising the steps of:
   protecting a torque sensor, rotating circuit, target, and speed sensor as well as other components by enclosing them within a housing;
   using the torque sensor mounted on the rotating element to produce a torque sensor signal indicating the torque placed on the rotating element;
   converting the torque sensor signal into a transmitted torque signal;
   producing a torque signal from the transmitted torque signal; and
   using the target connected to the rotating element and a speed sensor to produce a speed signal.

16. The method of claim 15 further comprising the step of utilizing uses of at least one surface acoustic wave device within the torque sensor.

17. The method of claim 16 further comprising the step of processing the speed signal and the torque signal to produce a power measurement.

18. The method of claim 17 further comprising the steps of:
   processing the speed signal to produce a speed measurement; and
   processing the torque signal to produce a torque measurement.

19. The method of claim 15 further comprising the step of processing the speed signal and the torque signal to produce a power measurement.

20. The method of claim 15 further comprising the steps of:
   processing the speed signal to produce a speed measurement; and
   processing the torque signal to produce a torque measurement.

21. The method of claim 16 further comprising the step of processing the speed measurement and the torque measurement to produce a power measurement.

* * * * *